US005497506A

United States Patent [19]

Takeyasu

[11] Patent Number: 5,497,506

[45] Date of Patent: Mar. 5, 1996

[54] PORTABLE TELEPHONE

[75] Inventor: Shinji Takeyasu, Osaka, Japan

[73] Assignee: Kabushiki Kaisha Kaken Corporation, Osaka, Japan

[21] Appl. No.: 248,493

[22] Filed: May 24, 1994

[30] Foreign Application Priority Data

Feb. 18, 1994 [JP] Japan .............................. 6-002116 U

[51] Int. Cl.$^{6}$ ...................................................... H04B 1/38

[52] U.S. Cl. ............................. 455/89; 455/90; 455/129; 379/433

[58] Field of Search ............................... 455/89, 90, 128, 455/99, 345, 346, 348, 129; 379/58, 59, 61, 62, 446, 447, 433, 425, 454, 455

[56] References Cited

U.S. PATENT DOCUMENTS

| | | | |
|---|---|---|---|
| 4,847,629 | 7/1989 | Shimazaki | 343/901 |
| 5,109,539 | 4/1992 | Inubushi et al. | 455/89 |
| 5,335,367 | 8/1994 | Adachi et al. | 455/90 |

FOREIGN PATENT DOCUMENTS

| | | | |
|---|---|---|---|
| 2-12762 | 4/1990 | Japan . | |
| 2-92241 | 7/1990 | Japan . | |
| 6495771 | 11/1990 | Japan | 379/61 |
| 4-137621 | 6/1991 | Japan . | |
| 2-85731 | 4/1992 | Japan . | |
| 3256263 | 4/1993 | Japan | 455/89 |

*Primary Examiner*—Edward F. Urban
*Attorney, Agent, or Firm*—Cushman Darby & Cushman

[57] ABSTRACT

An easy-to-use portable telephone is provided. The telephone has telephone proper 1, antenna 2, operating switch 3, and antenna moving mechanism 4. On the telephone proper 1, the back of the side on which the operating buttons 1*a* are provided and the left and right sides constitute hand-held sections, which are held by the left hand. The antenna 2 is provided to be extendable and retractable from the top side of telephone proper 1. The operating switch 3 is provided on the left-hand side of the telephone proper I and it is located such that when the user holds the telephone proper 1 with the left hand, it can be operated by the thumb. The antenna moving mechanism 4 moves antenna 2 upward when the "Talk" c is selected by operating switch 3 and moves antenna 2 downward when "Standby" b is later selected. The antenna moving mechanism 4 has micro-motor 5, motor control section 6, screw rod 7, and nut 8.

4 Claims, 2 Drawing Sheets

PORTABLE TELEPHONE

BACKGROUND OF THE INVENTION

1. Field of the Invention

The present invention relates to a portable telephone, specifically relating to the improvement of the operability thereof.

2. Description of the Related Art

The conventional portable telephone is structured to mount operating buttons, a liquid crystal display, and the like on the front of the telephone proper. For placing a call or when the unit is ringing, in the case of a portable telephone having such a structure, one has to hold the back and both sides of the telephone with one hand, while using the other hand to operate the talk button corresponding to the hook switch of a regular telephone and to pull up the antenna attached to the telephone.

When the call is finished, the antenna is pushed down and the talk button is then set to a standby status. However, operating such a portable telephone is a problem in that it requires operating it with two hands and it involves several operations. To address the problem of pushing up and down the antenna, a portable telephone has been proposed which permits automatic extension of the antenna by pushing a button, as disclosed in Japanese Utility Model Laid-open Publication 4-137621.

However, the portable telephone disclosed in the above publication still suffers from the following technical problems:

The portable telephone disclosed therein calls for mounting the antenna as a s spring-loaded type, so as to permit its upward extension with respect to the telephone: pushing a load-release button projects the antenna upwards. This requires an operation of pushing the antenna down, when the call is finished and the antenna is to be retracted.

The structure disclosed above has the load-release button mounted on the front of the telephone, requiring one to operate both the talk button and the release button when placing a call, again requiring a plurality of operations by two hands similar to the above conventional portable telephone, thus, there is a need of improvement therefor.

SUMMARY

The present invention is directed to a portable telephone that satisfies the above need.

It is an object of this invention to provide a portable telephone that permits a one-handed operation for both the extension and retraction of the antenna and the placement of a call.

In order to achieve the above objective, a portable telephone having the features of the present invention comprises a telephone proper in which the front side has operating buttons and a display thereon, and the back and both sides constitute hand-held sections, and an antenna which is mounted to be extendable and retractable through the top side of the telephone proper. One side of the telephone proper is equipped with an operating switch in an upper section of the hand-held sections. The operating switch is provided with three selections: "Off", "Standby", and "Talk". There is provided an antenna moving mechanism which moves said antenna upwards when "Talk" is selected and moves the antenna downwards when the "Standby" is later selected.

As will be described in detail below, the portable telephone of this invention permits a one-handed operation, normally with the left thumb, to move the antenna up and down when making a call and finishing the call, respectively. These features make it much more convenient to use the portable telephone. Since the left thumb can be further used to dial, this leaves the right hand free to use a pen, etc. Automatic antenna retraction eliminates battery discharging. This will avoid leaving the battery on, as may happen with conventional types when one forgets to turn off the power.

DESCRIPTION OF THE PREFERRED EMBODIMENTS

Figure 1:
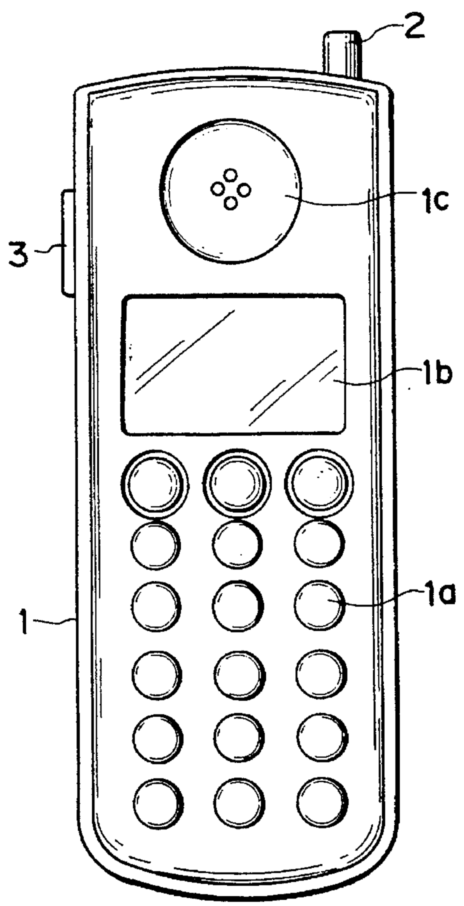
FIG. 1 is a plan view showing an example of a portable telephone of this invention.

It is an object of this invention to provide a portable telephone that permits a one-handed operation for both the extension and retraction of the antenna and the placement of a call.

In order to meet the above objective, the portable telephone of the present invention comprises a telephone proper in which the front side has operating buttons and a display thereon, and the back and both sides constitute hand-held sections; and an antenna which is mounted to be extendable and retractable through the top side of the telephone proper, wherein one side of the telephone proper is equipped with an operating switch in an upper section of the hand-held sections and the operating switch is provided with three selections: "Off", "Standby", and "Talk", and is provided an antenna moving mechanism which moves said antenna upwards when "Talk" is selected and moves the antenna downwards when the "Standby" is later selected.

The operating switch of this invention mentioned above may be constructed as a sliding switch that is slidably mounted along the longitudinal direction of the side of the telephone proper or as a rotary switch that is rotatably mounted on the side of the telephone proper.

The antenna may be formed in a hollow cylinder shape with one end closed off and is installed in a hollow cylindrical receptor section having its upper end opened, and the receptor mounted in said telephone proper; where the antenna moving mechanism comprises a micro-motor installed at the bottom within said receptor section, a screw rod which is connected to the rotating shaft of the micro-motor and which extends along the longitudinal axis direction of the receptor, a nut which is screwed onto the screw rod, has an external cylindrical surface sliding over the internal cylindrical surface of said receptor section, and is secured to the bottom side of the antenna, and a control section which causes the micro-motor to rotate forward for a designated period of time when "Talk" is selected on the operating switch and to rotate in reverse for a designated time when "Standby" is later selected.

A portable telephone of the above construction has an operating switch on the upper section of one of the sides of the telephone proper in which the back and both sides constitute hand-held sections, so that when the hand-held section is gripped with one hand, the operating switch would be located just above the thumb of the gripping hand, so as to permit a one-handed operation of the operating switch.

The operating switch is provided with three selections, "Off", "Standby", and "Talk", and has an antenna moving mechanism which moves the antenna upwards when the "Talk" button is selected, while moving the antenna downwards when "Standby" is selected, so that when a call is placed, the antenna automatically moves upwards; and when the call is finished, the antenna moves automatically downwards.

Suitable examples for the present invention are specifically described in reference to the attached drawings: 1 . . . Telephone Proper; 1*a* . . . Operating Buttons 1*b* . . . Liquid Crystal, Display; 1*e* . . . Receptor Section; 2 . . . Antenna; 3 . . . Operating Switch; 4 . . . Antenna Moving Mechanism; 5 . . . Micro-Motor; 6 . . . Motor Control; 7 . . . Screw Rod; 8 . . . Nut; a . . . "Off"; b . . . "Standby"; and c . . . "Talk".

Figure 3:
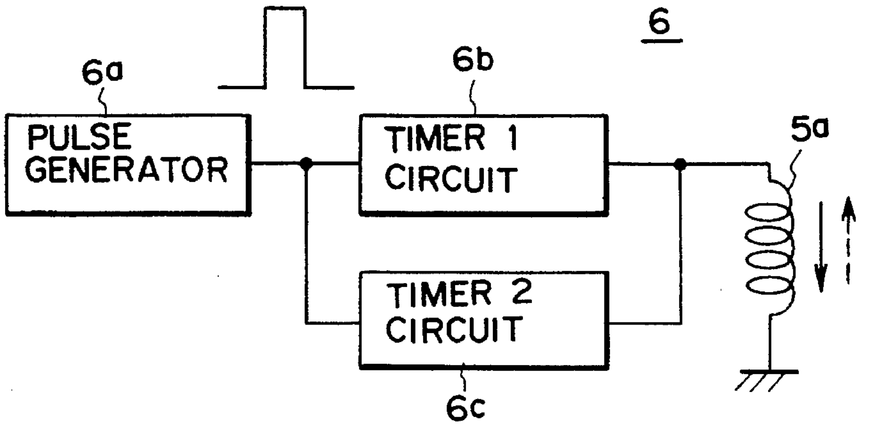
FIG. 3 is a functional block diagram illustrating an example of the motor control for the portable telephone of this invention.
Figure 2:
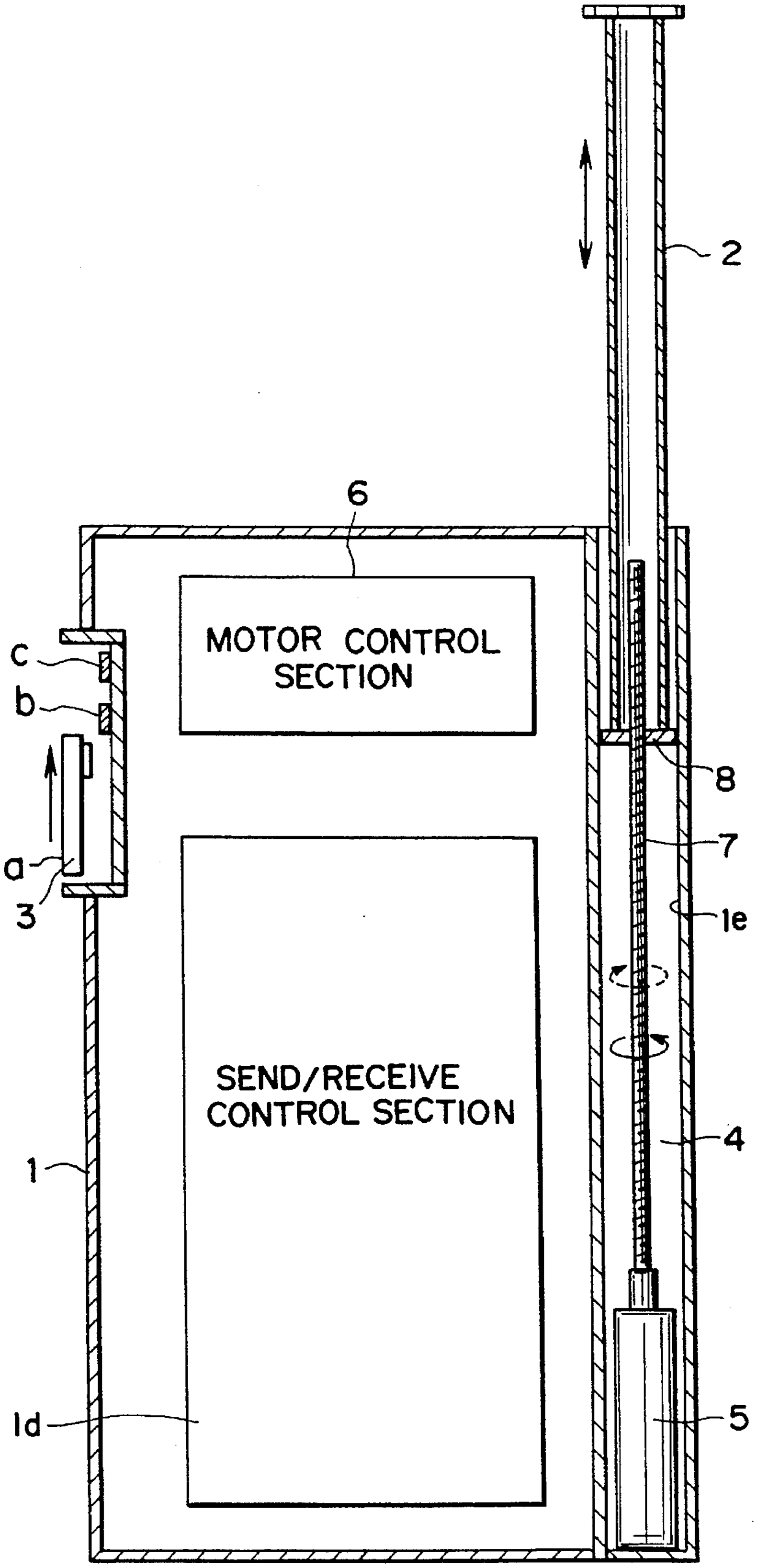
FIG. 2 is a cross section of an essential portion of the portable telephone of this invention.

FIGS. 1–3 show an example of a suitable portable telephone of this invention. The portable telephone given in the drawings is mainly comprised of telephone proper 1, antenna 2, operating switch 3 (also called the "black button"), and antenna moving mechanism 4.

The telephone proper 1 is shaped in an extended rectangular form, and its front side has operating buttons 1*a*, such as ten keys. Above the operating buttons 1*a* are mounted liquid a crystal display 1*b* and speaker 1*c*. The back of the sections on which the operating buttons 1*a* are mounted and the left and right sides form hand-held sections for the telephone proper 1; normally the user holds these sections with the left hand.

The antenna 2 is formed in a hollow cylindrical shape with its upper end closed off and is mounted on the right-hand side, opposite to the operating switch 3 with respect to the telephone proper 1, and is made extendable from, and retractable through, the top side of the telephone proper 1. The operating switch 3 is placed on the left-hand side and located upward in the hand-held section, so that when the user holds the telephone proper 1 by the left hand, the switch can be operated by the thumb.

The operating switch 3 is constructed as a sliding switch which slides along the longitudinal direction over the side of the telephone proper, 1; and the switch has three selections: "Off", a, "Standby", b, and "Talk", c. Telephone proper 1 contains a known telephone send-receive control section 1*d* therein; the send-receive control section 1*d* is capable of functions including ringing when a call is received with the operating switch 3 on "Standby" b, and sending the designated signals to the station when the ten keys are operated while "Talk" c is selected. The send-receive control section 1*d*, antenna 2, and operating switch 3 are electrically connected to one another.

Antenna moving mechanism 4 moves antenna 2 upwards when selecting "Talk" c of operating switch 3 and moves the antenna 2 downwards when "Standby" b is later selected. FIGS. 2 and 3 illustrate antenna moving mechanism 4. The antenna moving mechanism in the drawings has micro-motor 5 and a motor control 6.

The micro-motor 5 is an extended cylindrical shaped DC motor and is installed at the bottom of a circular-cross sectional receptor section 1*e* constructed along a side of the telephone proper 1. The rotating shaft of motor 5 is connected to a small-diameter screw rod 7. The screw rod 7 extends along the longitudinal direction of the receptor section 1*e* and has a plate nut 8 screwed thereto.

The antenna 2 has such a diameter that its external cylindrical surface slides over the internal cylindrical surface of the receptor section 1*e*, and the bottom end of antenna 2 has nut 8 secured thereto. Motor control section 6 is provided with pulse generator 6*a* which is activated when "Talk", c is selected on the operating switch 3 and inactivated when that selection is finished and that constantly sends out the designated pulse signals, while "Talk" c is selected, as well as timer circuits 6*b* and 6*c* which are connected in parallel to the output of the pulse generator 6*a*. The outputs of the timer circuits 6*b* and 6*c* are each connected to feed coil 5*a* of the micro-motor 5.

Timer 1 circuit 6*b* is activated when the pulse signals rise in the pulse generator 6*a*, that is, when "Talk" c is selected by operating switch 3, thereby sending out positive output signals only for the designated time to the field coil 5*a*, and the micro-motor 5 rotates forward only for the designated time. Timer 2 circuit 6*c* is activated by the falling of the pulse signal in pulse generator 6*a*, that is, when "Standby" b is selected after finishing the selection "Talk", c on the operating switch 3, thereby sending out negative output signals only for the designated time to field coil 5*a*; and the micro-motor 5 rotates in reverse only for the designated time.

When the micro-motor 5, which rotates in such a controlled manner, makes a forward rotation, with screw rod 7 and nut 8 provided on the rotating shaft of the motor 5 and with the antenna 2 secured to nut 8, the rotation causes the antenna to be guided up through receptor section 1*e* and to be projected out of the top end of the telephone proper 1. The rotation of the motor 5 in reverse causes the extended antenna 2 from the telephone proper 1 to be guided back into the receptor section 1*e*.

The movement stroke of antenna 2 may be preset at any desired magnitude by changing the duration of the output signals sent out from timer 1 circuit 6*b* and timer 2 circuits 6*c*, respectively, for example, within the range of moving antenna 2 upwards to the extent that the bottom end thereof does not come out of the receptor section 1*e*.

According to a portable telephone constructed as above, a sliding type operating switch 3 is provided toward the upper section of one of the sides of the telephone proper 1, for which the back and both sides are hand-held sections, so that when the hand-held sections are gripped by one hand, for example, with the left hand, the operating switch 3 would be located just above the thumb of the gripping hand, so as to permit a one-handed operation of the operating switch 3.

The operating switch 3 has three selections: "Off", a, "Standby", b, and "Talk", c, and has an antenna moving mechanism 4 which moves antenna 2 upwards when "Talk" c is selected and moves antenna 2 downwards when "Standby" b is later selected, so that the switch automatically activates to move the antenna upwards when the call is placed and to move the antenna 2 downwards when the call is finished.

The above example illustrated the operating switch 3 as a sliding-type which slides over the side surface of telephone proper 1, but the present invention is not limited to such a system. For example, it may be a thumb operable rotary switch mounted rotatably on a side of telephone proper 1. The above example also showed a ball screw mechanism for the antenna moving mechanism 4 comprised of a screw rod 7 and nut 8; however, this mechanism may be replaced, for example, by a rack-and-pinion mechanism.

As described in detail in the above examples, the portable telephone of this invention permits a one-handed, one-touch operation to move the antenna up or down when placing a call, making it much more convenient to use the portable telephone.

As specifically described above, the present invention provides a truly one-handed, one-touch operable mobile telephone, which is characterized by the operation of the black button( the operating switch 3 ) as summarized below:

(1) When not in use, turn the black button OFF. (Use left thumb.)

(2) For "Standby", push the black button up to ON. (Use left thumb.)

(3) For send/rec, push the black button all the way. (Use left thumb.) The antenna automatically extends.

(4) When finished with the call, push the black button back to ON or OFF. (Use left thumb.) The antenna automatically retracts.

Thus, the advantages of this portable telephone are:

(5) The left thumb is used to dial a number and to leave the right hand free to use a pen.

(6) Automatic antenna retraction eliminates battery discharging. This will avoid leaving the battery on, as may happen with conventional types when one forgets to turn off the power.

We claim:

1. A portable telephone comprising a telephone proper in which the front side includes operating buttons and a display thereon, and the back and both sides are hand-held sections, and an antenna which is mounted to be extendable and retractable through the top side of the telephone proper, wherein one side of said telephone proper is equipped with an operating switch in the upper section of the hand-held sections and the operating switch has three selections: off mode, on (standby) mode, and talk mode;

wherein there is provided an antenna moving mechanism which moves said antenna upwards when the talk mode is selected and moves the antenna downwards when the standby mode is later selected; and wherein the telephone further comprises a control circuit for controlling the antenna moving mechanism including a pulse generator, having an output for sending out pulse signals, activated when the operating switch is in the talk position and inactivated when standby is selected, a first timer circuit connected to the output of the pulse generator for sending an output signal for a first designated period of time for moving the antenna upward to the antenna moving mechanism when the pulse generator is activated; and a second timer circuit connected to the output of the pulse generator, in parallel with the first timer circuit, for sending a second output signal to the antenna moving mechanism for a second designated period of time for moving the antenna downward when the pulse generator is inactivated.

2. A portable telephone as set forth in claim 1 in which said operating switch is constructed as a sliding switch mounted slidably along the longitudinal direction of the side of the telephone proper.

3. A portable telephone as set forth in claim 1 in which said operating switch is constructed as a rotary switch mounted rotatably on the side of the telephone proper.

4. A portable telephone as set forth in any of the claims 1–3, wherein the antenna is formed in a hollow cylinder shape with one end closed off and is installed in a hollow cylindrical receptor section having its upper end opened, wherein the receptor mounted in said telephone proper; and wherein the antenna moving mechanism comprises a micro-motor installed at the bottom within said receptor section, a screw rod which is connected to the rotating shaft of the micro-motor and which extends along the longitudinal axis direction of the receptor, and a nut which is screwed onto the screw rod, has an external cylindrical surface sliding over the inner cylindrical surface of said receptor section, and is secured to the bottom side of the antenna;

wherein the control circuit causes the micro-motor to rotate forward for the first designated period of time when "Talk" is selected on the operating switch and to rotate in reverse for the second designated time when "Standby" is later selected.

* * * * *